United States Patent Office 3,752,782
Patented Aug. 14, 1973

3,752,782
STABILIZED POLYACRYLONITRILE COMPOSITIONS AND METHOD OF FORMING SAME
Darrell R. Thompson, Somerville, N.J., and Michael W. Ensley, Charlotte, N.C., assignors to Celanese Corporation, New York, N.Y.
No Drawing. Filed Apr. 22, 1971, Ser. No. 136,622
Int. Cl. C08f 45/24
U.S. Cl. 260—29.6 AN          14 Claims

ABSTRACT OF THE DISCLOSURE

A method of forming stabilized polyacrylonitrile compositions which are particularly suited for the spinning of polyacrylonitrile fibers and films and the compositions produced thereby wherein acrylonitrile polymers containing at least 85 percent acrylonitrile are dissolved in a solvent containing an unsaturated hydrocarbon as a color stabilizer, which solvent is acetonitrile or an acetonitrile/water mixture. Preferably, the solvent and polymer are purged with nitrogen and the pH of the solvent is adjusted to about 6.0–7.0.

BACKGROUND OF THE INVENTION

This invention relates to the stabilization of polyacrylonitrile compositions. More particularly, the invention relates to the stabilization of polyacrylonitrile compositions containing a low-boiling solvent, which compositions are particularly useful for the formation of shaped articles such as fibers and films and which have a tendency to develop color either upon standing or upon the application of heat.

The terms "polyacrylonitrile" and "acrylonitrile polymers" as used herein refer to homopolymers as well as copolymers of acrylonitrile containing at least 85 percent by weight acrylonitrile and up to about 15 percent by weight of at least one other ethylenically unsaturated compound copolymerizable with acrylonitrile.

The utility of acrylonitrile polymers is well-established, particularly for the preparation of such shaped articles as fibers and films. However, preparative techniques generally are restricted to dry spinning and wet spinning from solutions having a polymer concentration up to about 25 to 40 percent by weight. Conventional spinning technology, dry spinning in particular, has utilized relatively high-boiling solvents, e.g., boiling above about 100 degrees centigrade, for forming spinnable dopes of acrylonitrile polymers. The formation of shaped articles by a melt extrusion process, that is, a process in which the polymer is melted and the molten polymer extruded through a die or spinnerette into an inert medium in contradistinction to dry and wet spinning methods in which a solution of the polymer is extruded through a die or spinnerette, is not practical because of the relatively high melting temperatures of acrylonitrile polymers containing at least 85 percent by weight acrylonitrile and because of the tendency of such polymers to decompose before or during melting.

Acrylonitrile polymers having an acrylonitrile content of at least 85 percent generally are insoluble in the more common solvents. Whenever suitable solvents have been found, however, the application of heat usually is necessary in order to effect solution. The application of heat to effect solution usually results in the development of a pale yellow color in the resultant solution, which color generally darkens and becomes brown with time. Even without the application of heat or upon removal of heat after a solution has been obtained, color develops in solutions upon standing for prolonged periods of time. Color development is more pronounced at elevated temperatures and in the presence of bases or other strong nucleophiles. Color development is most severe in N,N-dimethylformamide solutions such as those employed in dry spinning. Obviously, any color developed in polymer solutions or spinning dopes will be carried over into the products formed therefrom.

The mechanism responsible for color formation and the nature of the chromophores involved still are uncertain. The color may be caused by the presence of metal ions such as iron, copper, and manganese in the polymer solutions. Impurities other than metal ions present in the solvents also have been cited as a cause. The employment of amides, such as N,N-dimethylformamide, as solvents may result in the thermal decomposition of the solvent to give amines which in turn may cause color formation. Or, color formation may be caused by conjugation of carbon-nitrogen double bonds derived from the cyanide groups in the polyacrylonitrile. Such conjugated double bonds conceivably may result from a cyclization reaction initiated by oxidation products, such as hydroperoxides, in the polymer. The resultant conjugated structures would be colored because of the low energy electronic transitions possible in the resonating double bond system. Regardless of the mechanism which gives rise to color in solutions of acrylonitrile polymers, e.g., spinning dopes, the presence of color in polymer solutions results in shaped articles which are colored. Such coloration is undesirable for aesthetic reasons and contributes to product non-uniformity.

SUMMARY OF THE INVENTION

It is therefore an object of the present invention to provide stabilized polyacrylonitrile compositions containing a low-boiling solvent.

It is another objects to prevent undesirable color formation in polyacrylonitrile compositions containing a low-boiling solvent.

Still another object of the present invention is to minimize color formation in polyacrylonitrile compositions containing a low-boiling solvent when such compositions either are permitted to stand for prolonged periods of time or are heated, either to effect solution of the polyacrylonitrile in the solvent or during spinning of said composition to provide shaped articles.

Yet another object is to provide stabilized polyacrylonitrile compositions containing a low-boiling solvent from which crystal-clear shaped articles may be prepared wherein clarity and freedom from color are independent of thickness, fiber denier, or the like.

It is also an object of the present invention to provide a method for preparing stabilized polyacrylonitrile compositions containing a low-boiling solvent, which compositions are particularly suited for the formation of shaped articles of polyacrylonitrile.

Yet another object is to provide a method for preparing stabilized polyacrylonitrile compositions containing a low-boiling solvent, which solvent is acetonitrile or an acetonitrile/water mixture and which compositions can, if desired, be stored or shipped as a solid or gelled material and subsequently formed into a spinning solution or dope for the preparation of polyacrylonitrile fibers and films.

These and other objects will be apparent to those skilled in the art from a consideration of the description and claims of the invention which follow.

In accordance with the present invention, stabilized polyacrylonitrile compositions containing a low-boiling solvent are obtained by the process which comprises the steps of adding a minor amount of an unsaturated hydrocarbon or allyl ether stabilizer to a solvent which is acetonitrile or an acetonitrile/water mixture containing up to about 50 weight percent water, adding acrylonitrile polymer to the solvent-stabilizer mixture, heating and mixing the polyacrylonitrile-solvent-stabilizer mixture under superatmospheric pressure to a temperature above about the boiling point at atmospheric pressure of said solvent and below the degradation temperature of the polyacrylonitrile, i.e., within the range from about 80 to 160 degrees centigrade, to produce a solution. The resultant solution then can be cooled to a temperature below its original solubilizing temperature and above about the boiling point at atmospheric pressure of said solvent without gelation occurring. Cooling the resultant solution to a temperature below about the boiling point at atmospheric pressure of said solvent, e.g., to ambient temperature, results in the gelation of said solution. Preferably, the stabilizer is added to said solvent prior to the addition of the polyacrylonitrile to said solvent. Also, the solvent and polyacrylonitrile preferably are purged separately with nitrogen and the pH of the solvent is adjusted to about 6.0–7.0.

While the present invention contemplates the use of acetonitrile alone as solvent, it is preferred that an acetonitrile/water mixture be employed as solvent wherein said solvent contains up to about 45 to 50 percent water, based on the weight of acetonitrile. Spinning solutions of a stabilized polyacrylonitrile composition of the present invention are obtained by maintaining said composition under sufficient superatmospheric pressure to permit the maintenance of said composition at a temperature above the gel temperature of said composition without distillation of said solvent, said gel temperature being near to but below the boiling point at atmospheric pressure of said solvent.

In general, the unsaturated hydrocarbon stabilizers of the present invention contain only hydrogen and carbon. Further, while a portion of the unsaturation present in any given stabilizer may be aromatic, there is present in the stabilizer at least one non-aromatic carbon-carbon double bond. More than one non-aromatic double bond may be present in the stabilizer, provided that the molecular structure prevents migration and conjugation of the non-aromatic double bonds.

DETAILED DESCRIPTION OF THE INVENTION

As indicated hereinbefore, stabilized polyacrylonitrile compositions containing a low-boiling solvent are obtained by the inclusion in said compositions of a minor amount of an unsaturated hydrocarbon. By a minor amount is meant less than about 10 percent, based on the weight of polyacrylonitrile, and preferably less than about 5 percent. The most preferred range of unsaturated hydrocarbon addition is from about 0.01 percent to about 3.0 percent. Also as indicated hereinbefore, the unsaturated hydrocarbon stabilizers of the present invention, which stabilizers contain only hydrogen and carbon, may be aliphatic, alicyclic, or aromatic; if aromatic, at least one non-aromatic carbon-carbon double bond must be present. Examples of the unsaturated hydrocarbon stabiilzers of the present invention include, among others, styrene, t-butylstyrene, cyclohexene, pinene, norbornene, camphene, bornylene, and the like. Preferred stabilizers include styrene, t-butylstyrene, cyclohexene, and pinene, with styrene and cyclohexene being most preferred.

As stated above, although the mechanisms involved are still uncertain, in addition to the afore-disclosed unsaturated aliphatic, alicyclic or aromatic hydrocarbon stabilizers having at least one non-aromatic carbon-carbon double bond; allyl ether has also been found to be an effective color stabilizer for use in the instant invention.

The presence of said unsaturated hydrocarbon stabilizers in polyacrylonitrile compositions containing a low-boiling solvent effectively minimizes color formation in said compostions, even when said compositions are exposed to heat. The effectiveness of said stabilizers, however, may be improved by excluding oxygen from said compositions and by adjusting the pH of the solvent to about 6.0–7.0.

Although various means for excluding oxygen from said compositions and for adjusting the pH of the solvent will be obvious to those skilled in the art, the following procedure is both satisfactory and preferred. The unsaturated hydrocarbon stabilizer is dissolved in the solvent at ambient temperature. The pH of the resulting solution then is adjusted to 6.0–7.0 either by the addition of an acid such as concentrated sulfuric acid or a base such as sodium hydroxide. Both dissolved and atmospheric oxygen are displaced by bubbling nitrogen through the pH-adjusted solution.

Separately, polyacrylonitrile powder is placed in a vacuum chamber and the chamber evacuated. Nitrogen then is introduced into the chamber. This procedure of evacuation and nitrogen purging is repeated several times as necessary. The polymer and pH-adjusted solution then are brought together and heated under a nitrogen atmosphere to effect solution. The resultant stabilized polyacrylonitrile composition then is either stored or used directly to prepare shaped articles.

In addition to the foregoing procedure for improving the effectiveness of the unsaturated hydrocarbon stabilizers of the present invention, the addition to the solvent-stabilizer solution of a small amount of what may be termed a stabilizer enhancer often increases the effectiveness of said unsaturated hydrocarbon stabilizers, said increase in effectiveness being distinctly separate from the increase in effectiveness resulting from the procedure of oxygen exclusion and solvent pH adjustment as described hereinbefore. By the term "stabilizer enhancer" is meant a compound the use of which in conjunction with said stabilizers allows reduced color formation when compared to the use of said stabilizers alone. An example of a stabilizer enhancer is sodium hydrogen sulfite. By a "small amount" is meant less than about 0.1 percent by weight, based on the amount of polyacrylonitrile.

As stated hereinbefore, the present invention is directed to the formation of stabilized polyacrylonitrile compositions wherein the polyacrylonitrile contains at least 85 percent acrylonitrile. These acrylonitrile polymers can be acrylonitrile homopolymers as well as copolymers of two or more monomers wherein up to about 15 percent of the polymer can be another ethylenically unsaturated compound which is copolymerizable with acrylonitrile. Such materials, which can be monomers or polymers which are copolymerizable with the acrylonitrile, usually are added to modify and/or enhance certain characteristics of the polyacrylonitrile or shaped articles made therefrom. Often the material copolymerized with the acrylonitrile contains a chemical group which increases the basic dyeability of the resulting polymer. Such dyeability-enhancing compounds normally contain sulfur or phosphorous in the ethylenically unsaturated material copolymerizable with the acrylonitrile. Typically, such sulfur- or phosphorous-containing compounds are added in an amount of from about 0.1 to about 5 percent by weight, based on the weight of the total polymer composition. Other modifying substances usually are used in amounts up to about 15 percent. Typical ethylenically unsaturated monomers copolymerizable with acrylonitrile include, among others, methyl acrylate, vinyl acetate, vinylidene chloride, methyl methacrylate, methallyl alcohol, vinylidene cyanide, styrene sulfonic acids, sodium methallylsulfonate, mixtures and partial polymers thereof, and the like, all of which are well known to those skilled in the art. Similarly, acid dyeability may be imparted to the polyacrylonitrile by the use of amine-containing comonomers such as allylamine. The polymers are obtained by conventional methods which are well known in the art.

The degree to which the polymer is polymerized is dependent upon the end use for which the polymer is intended. Thus, for the spinning of polyacrylonitrile fibers, the polymer preferably is polymerized to an inherent viscosity, measured at 25 degrees centigrade in dimethylformamide of from about 0.5 to about 2.5 and more preferably from about 1.2 to about 1.8. Of course, polymers having higher inherent viscosities can be used, resulting in higher solution viscosities for a given solvent concentration; higher inherent viscosities also may result in a loss or reduction of certain desirable properties, such as abrasion resistance, fibrillation, and the like.

In most instances wherein the present compositions are most desirably used, solutions having a high concentration of solids are preferred. With the present solvent system and process, solutions having a high concentration of solids are readily obtained with acrylonitrile polymers having inherent viscosities in the range normally used for commercial fiber spinning, i.e., from about 1.2 to about 1.8. In particular, solutions having a solids content of from about 30 to about 70 percent by weight are readily obtained. The more preferred spinning solutions have a solids content in the range of from about 35 to about 55 percent with polymers having inherent viscosities of from about 1.2 to about 1.8 or higher. With polymers having lower inherent viscosities, e.g., from about 0.5 to about 1.2, solutions having a solids content of up to about 70 percent or higher can be obtained.

The solvent may be acetonitrile alone or more preferably an acetonitrile/water mixture. The addition of water to acetonitrile lowers both the gel temperature of the polymer solution and the initial solution temperature of the polymer. Therefore, in the solvent portion, it is preferable to use up to about 50 weight percent of water based on the weight of acetonitrile, more preferably from about 2 to about 40 weight percent water, and most preferably from about 18 to about 35 weight percent water. In the most preferred range of water content, the lowest solution viscosities for a given polymer are obtained.

At atmospheric pressure, the boiling point of acetonitrile is about 82 degrees centigrade and that of the azeotrope of 15 percent water is about 76 degrees centigrade. To form the initial solution, temperatures in excess of the boiling temperature of acetonitrile are used, particularly for the more difficultly soluble acrylonitrile polymers. Consequently, the process is operated under superatmospheric pressure which can be either an applied pressure or the solvent vapor pressure which is developed autogenously at the elevated temperatures. The pressure employed preferably is that required to maintain the solvent primarily in the liquid phase at the solvating temperature. This required pressure increases with increasing temperature and is in the range of about 30 to about 40 pounds per square inch gauge at about 100 degrees centigrade. Thus, solvation preferably is conducted in a pressure unit or sealed system to prevent the escape of solvent vapor and to maintain the solvent in the liquid phase.

The solvation temperature required to obtain the compositions of the present invention will vary with the proportions of acetonitrile and water and with the proportion and kind of polyacrylonitrile, within the range of from about 80 to about 160 degrees centigrade. Once solvation is attained, however, the temperature of the composition can be reduced to the desired holding or spinning temperature. Reducing the temperature of the composition below about 80 degrees centigrade, again depending upon the nature of the composition, results in the gelling of the composition. Accordingly, the composition can be either cooled and retained in a gelled state for storage or shipment or maintained in the temperature range of from about 80 degrees centigrade to the degradation temperature of the polymer. If the composition is stored as a gel, it is preferred to retain the composition in a sealed container to reduce or eliminate the gradual loss of solvent therefrom over a period of time.

It may be pointed out that the compositions of the present invention are remarkably stable to prolonged heating. By way of illustration, a composition consisting of 40 weight percent of a polyacrylonitrile comprised of 95 percent by weight of acrylonitrile and 60 weight percent of an acetonitrile/water mixture containing 22 percent water shows practically no change in viscosity after three days at 100 degrees centigrade.

The following examples will serve to illustrate the invention without intending to limit it in any manner:

EXAMPLE 1

To an autoclave having a stirring means and a heating means and fitted with a condenser and a nitrogen inlet tube extending to the bottom of the vessel are added 60 parts of a solvent consisting of 80 percent by weight acetonitrile and 20 percent by weight water and 0.2 part (0.5 weight percent, based on the weight of polyacrylonitrile) of styrene. The mixture is stirred at ambient temperature until a solution is obtained. The pH of the resulting solution is adjusted to about 6.0–7.0 by the drop-wise addition of concentrated sulfuric acid. Nitrogen then is bubbled slowly through the solution to displace dissolved and atmospheric oxygen. During this time, a vacuum chamber is charged with 40 parts of polyacrylonitrile powder characterized as follows:

95 percent polyacrylonitrile
4.8 percent methyl acrylate
0.2 percent sodium methyl allyl sulfonate The vacuum chamber is evacuated and nitrogen introduced until atmospheric pressure is attained. The evacuation-nitrogen introduction cycle is repeated two more times. The polyacrylonitrile powder then is charged to the autoclave under a nitrogen purge. While maintaining a nitrogen atmosphere in the autoclave, the polymer-solvent mixture is heated at 85 degrees centigrade and under a pressure of 2500 mm. mercury for 0.5 hour. The resultant solution has a color rating of 4 after 24 hours at 110 degrees centigrade and is comprised of 40 percent solids.

Color rating is determined by comparing the polymer solution with a series of color tubes containing increasing concentrations of a yellow-brown dye, Irgacet Yellow 2RL, in N,N-dimethylformamide. Tube number 1 contains only solvent. Tube number 2 contains $1.0 \times 10^{-4}$ percent by weight of the dye. The concentration of dye in each succeeding tube increases by $1.0 \times 10^{-4}$ weight percent, so that the dye concentration in any given tube is given by (tube number—1) $\times 10^{-4}$ weight percent.

For control purposes, the procedure of Example 1 is repeated, except that styrene addition, pH adjustment, and oxygen exclusion are omitted. After 24 hours at 110 degrees centigrade, the polymer solution has a color rating of 41.

EXAMPLE 2

The procedure of Example 1 is repeated, except that oxygen exclusion is omitted. After 24 hours at 110 degrees centigrade, the polymer solution has a color rating of 5.

EXAMPLE 3

The procedure of Example 1 is repeated, except that pH adjustment is omitted. After 24 hours at 110 degrees centigrade, the polymer solution has a color rating of 5.

EXAMPLE 4

The procedure of Example 3 is repeated, except that the amount of styrene is decreased to 0.1 weight percent. After 24 hours at 110 degrees centigrade, the polymer solution has a color rating of 6.

EXAMPLE 5

The procedure of Example 3 is repeated, except that the amount of styrene is decreased to 0.05 weight percent. After 24 hours at 110 degrees centigrade, the polymer solution has a color rating of 6.

EXAMPLE 6

The procedure of Example 1 is repeated, except that pH adjustment and oxygen exclusion are omitted. After 24 hours at 110 degrees centigrade, the polymer solution has a color rating of 7.

EXAMPLE 7

The procedure of Example 6 is repeated, except that 0.02 weight percent of sodium hydrogen sulfite as a stabilizer enhancer is added. The polymer solution is slightly turbid and has a color rating of 4 after 24 hours at 110 degrees centigrade.

EXAMPLE 8

The procedure of Example 6 is repeated, except that the styrene is replaced with an equal amount of cyclohexene. The polymer solution is slightly turbid and has a color rating of 9 after 24 hours at 110 degrees centigrade.

EXAMPLE 9

The procedure of Example 8 is repeated, except that the styrene is replaced with an equal amount of cyclohexene and the pH adjustment is omitted. After 24 hours at 110 degrees centigrade, the polymer solution has a color rating of 4.

EXAMPLE 10

The procedure of Example 1 is repeated, except that the styrene is replaced with an equal amount of pinene. After 24 hours at 110 degrees centigrade, the polymer solution has a color rating of 6.

EXAMPLE 11

The procedure of Example 3 is repeated, except that the styrene is replaced with an equal amount of pinene. After 24 hours at 110 degrees centigrade, the polymer solution has a color rating of 6.

EXAMPLE 12

The procedure of Example 6 is repeated, except that the styrene is replaced with an equal amount of allyl ether. After 24 hours at 110 degrees centigrade, the resulting solution has a color rating of 16.

EXAMPLE 13

The procedure of Example 6 is repeated, except that the styrene is replaced with an equal amount of t-butylstyrene. After 24 hours at 125 degrees centigrade, the polymer solution has a color rating of 11.

As a control, the procedure of Example 13 is repeated, except that the addition of t-butylstyrene is omitted. After 24 hours at 125 degrees centigrade, the polymer solution has a color rating of 71.

EXAMPLE 14

The procedure of Example 6 is repeated. After 24 hours at 135 degrees centigrade, the polymer solution has a color rating of 16.

EXAMPLE 15

The procedure of Example 6 is repeated, except that the amount of styrene is increased to 1.0 weight percent. The resulting solution is slightly turbid. After 24 hours at 135 degrees centigrade, the polymer solution has a color rating of 11.

EXAMPLE 16

The procedure of Example 6 is repeated, except that the amount of styrene is increased to 2.0 weight percent. The resulting solution is slightly turbid. After 24 hours at 135 degrees centigrade, the polymer solution has a color rating of 7.

From a reading of the present disclosure, various changes and modifications in the disclosed process will be obvious to those skilled in the art. For example, the pH adjustment of the solvent may be accomplished by the addition of mineral acids other than sulfuric acid or by the addition of anhydrides of mineral acids. The pH adjustment of the solvent also may be accomplished by the use of organic acids, such as carboxylic acids (e.g., acetic acid) and sulfonic acids. Alternatively, solvent pH control may be accomplished by the use of bases such as sodium hydroxide or buffers of various types. Furthermore, exclusion of oxygen from the solvent may employ reduced pressures in conjunction with nitrogen purging. These and other changes and modifications by those skilled in the art are considered to be within the spirit and scope of the present invention.

Throughout the foregoing disclosure and the claims which follow, the compositions of the present invention are referred to as solutions of a polymer in a solvent. However, the exact nature of said compositions is not known. It does appear, though, that the acetonitrile portion of the solvent is absorbed by the polymer to fluidize it, rather than the polymer being dissolved in the solvent. Thus, at least in some instances, said compositions may deviate from typical solutions. In view of the uncertainties involved, the terminology employed is considered satisfactory since such terminology enables any person skilled in the art to make and use said compositions.

Having thus disclosed the invention, what is claimed is:

1. A stabilized film or fiber forming polyacrylonitrile composition consisting essentially of polyacrylonitrile containing at least 85 percent acrylonitrile and up to about 15 weight precent of at least one other ethylenically unsaturated material copolymerized therewith having added thereto a solvent which comprises acetonitrile containing up to about 50 percent water and from about 0.01 to 3 weight percent, based on the weight of said polyacrylonitrile of unsaturated aliphatic, alicyclic or an aromatic hydrocarbon stabilizer having at least one non-aromatic carbon-carbon double bond or allyl ether.

2. The stabilized polyacrylonitrile composition of claim 1 wherein said polyacrylonitrile consisting essentially of from about 30 to about 70 percent of said composition.

3. The stabilized film or fiber forming polyacrylonitrile composition of claim 1 wherein said stabilizer is selected from the group consisting of styrene, t-butylstyrene, cyclohexene, allyl ether, and pinene.

4. The stabilized film or fiber forming polyacrylonitrile composition of claim 1 wherein said solvent contains from about 2 to about 40 percent water and said stabilizer is selected from the group consisting of styrene, t-butylstyrene, cyclohexene, allyl ether, and pinene.

5. The stabilized film or fiber forming polyacrylonitrile composition of claim 4 wherein said polyacrylonitile is a homopolymer.

6. The stabilized film or fiber forming polyacrylonitrile composition of claim 4 wherein at least one of said ethylenically unsaturated materials is a sulfur-containing material.

7. The stabilized film or fiber forming polyacrylonitrile composition of claim 4 wherein at least one of said ethylenically unsaturated materials is methyl acrylate.

8. A stabilized film or fiber forming polyacrylonitrile composition consisting essentially of from about 30 to about 70 percent of polyacrylonitrile containing from 85 to about 99 percent acrylonitrile, from about 0 to about 15 percent of an ethylenically unsaturated material copolymerized therewith, and from about 0.1 to about 2 percent of a sulfur-containing ethylenically unsaturated material also copolymerized therewith; having added thereto from about 29 to about 60 percent of a solvent consisting of acetonitrile and from about 2 to about 40 percent water; and from about 0.01 to about 3 weight percent, based on the weight of said polyacrylonitrile, of a stabilizer selected from the group consisting of styrene, t-butylene styrene, cyclohexene, allyl ether, and pinene; said composition being maintained under superatmospheric pressure greater than about the vapor pressure of said solvent and at a temperature at from about 80 to about 160 degrees centigrade.

9. A method of forming stabilized film or fiber forming polyacrylonitrile compositions which comprises the steps of adding from about 0.01 to about 3 weight percent, based on the weight of said polyacrylonitrile of an unsaturated aliphatic, alicyclic or aromatic hydrocarbon stabilizer having at least one non-aromatic carbon-carbon double bond or allyl ether to a solvent which comprises acetonitrile containing up to about 50 percent water adding polyacrylonitrile which contains at least 85 percent acrylonitrile and up to about 15 weight percent of at least one other ethylenically unsaturated material copolymerized therewith, and heating and mixing the resultant mixture under superatmospheric pressure to a temperature above about 80 degrees centigrade and below the degradation temperature of said polyacrylonitrile to produce a solution.

10. The method of claim 9 wherein said stabilizer is selected from the group consisting of styrene, t-butylstyrene, cyclohexene, allyl ether, and pinene.

11. The method of claim 9 wherein said superatmospheric pressure is greater than the vapor pressure of said solvent.

12. The method of claim 9 wherein oxygen is excluded and the pH of the solvent is adjusted to about 6.0–7.0.

13. The method of claim 9 wherein said polyacrylonitrile makes up from about 30 to about 70 percent of said compositions.

14. A method of forming stabilized film or fiber forming polyacrylonitrile compositions which comprises the steps of adding from about 0.01 to about 3 weight percent, based on the weight of polyacrylonitrile, of a stabilizer which is selected from the group consisting of styrene, t-butylstyrene, cyclohexene, allyl ether, and pinene to a solvent which consists of acetonitrile and from about 2 to about 40 percent water; adjusting the pH of the resulting solution to about 6.0–7.0; purging the resulting solution with nitrogen to exclude dissolved and atmospheric oxygen; adding polyacrylonitrile containing at least 85 percent acrylonitrile and up to about 15 weight percent of at least one other ethylenically unsaturated material copolymerized therewith, wherein said polyacrylonitrile has been purged with nitrogen; and heating and mixing the resultant mixture in nitrogen atmosphere under superatmospheric pressure which is greater than the vapor pressure of said solvent and at a temperature above about 80 degrees centigrade and below the degradation temperature of said polyacrylonitrile.

References Cited
UNITED STATES PATENTS

| | | | |
|---|---|---|---|
| 3,574,177 | 4/1971 | Nakajima et al. | 260—29.6 AN |
| 2,525,521 | 10/1950 | Caldwell | 260—29.6 AN |
| 3,194,862 | 7/1965 | Coover et al. | 260—29.6 AN |
| 3,632,543 | 1/1972 | Nakanome et al. | 260—29.6 AN |

HAROLD D. ANDERSON, Primary Examiner

U.S. Cl. X.R.

260—29.6 MH, 29.6 ME, 32.4